United States Patent
Qiu et al.

(10) Patent No.: US 12,154,192 B2
(45) Date of Patent: Nov. 26, 2024

(54) METHOD AND APPARATUS FOR UPDATING MUSIC PAGE DISPLAY BASED ON COLOR

(71) Applicant: BEIJING ZITIAO NETWORK TECHNOLOGY CO., LTD., Beijing (CN)

(72) Inventors: Yingjia Qiu, Beijing (CN); Chaopeng Liu, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/601,240

(22) PCT Filed: Jul. 14, 2021

(86) PCT No.: PCT/CN2021/106306
§ 371 (c)(1),
(2) Date: Oct. 4, 2021

(87) PCT Pub. No.: WO2022/246985
PCT Pub. Date: Dec. 1, 2022

(65) Prior Publication Data
US 2024/0095973 A1    Mar. 21, 2024

(30) Foreign Application Priority Data
May 27, 2021 (CN) .................. 202110587306.1

(51) Int. Cl.
*G06T 11/00* (2006.01)
*G06T 7/90* (2017.01)

(52) U.S. Cl.
CPC .............. *G06T 11/001* (2013.01); *G06T 7/90* (2017.01); *G06T 2200/24* (2013.01)

(58) Field of Classification Search
None
See application file for complete search history.

(56) References Cited

U.S. PATENT DOCUMENTS 7,478,323 B2 *   1/2009  Dowdy .................. G09F 23/00
                                                                   715/275
9,514,095 B2 *  12/2016  Kimoto .................. G06F 17/00
(Continued)

FOREIGN PATENT DOCUMENTS

CN    106997265 A    8/2017
CN    108334531 A    7/2018
(Continued)

OTHER PUBLICATIONS iTunes 12.2 and iOS 8.4: Add Custom Artwork to Playlists Jul. 3, 2015 https://kirkville.com/itunes-12-2-and-ios-8-4-add-custom-artwork-to-playlists/ (Year: 2015).*
(Continued)

*Primary Examiner* — Jason A Pringle-Parker

(57) ABSTRACT

Embodiments of the present disclosure provide a method and apparatus for updating page display, an electronic device, and a storage medium. The method includes: obtaining a cover image of an album to which a currently played song belongs, in response to a page refresh operation of a user; extracting a target dominant color of the cover image; and updating a cover of a predetermined playlist in a refreshed page based on the target dominant color.

19 Claims, 8 Drawing Sheets

(56) References Cited

U.S. PATENT DOCUMENTS

| | | | |
|---|---|---|---|
| 2006/0206811 A1* | 9/2006 | Dowdy | G09F 23/00 715/201 |
| 2007/0038671 A1* | 2/2007 | Holm | G06F 16/683 |
| 2007/0204227 A1* | 8/2007 | Kretz | G06F 16/68 |
| 2008/0168365 A1* | 7/2008 | Chaudhri | G06F 16/40 715/762 |
| 2010/0229094 A1* | 9/2010 | Nakajima | G11B 27/322 715/727 |
| 2011/0234480 A1* | 9/2011 | Fino | G11B 27/105 345/156 |
| 2014/0075308 A1* | 3/2014 | Sanders | G06F 3/0482 715/716 |
| 2014/0180762 A1* | 6/2014 | Gilbert | G06Q 30/02 705/7.29 |
| 2014/0324885 A1* | 10/2014 | McKenzie | G06F 16/9038 707/748 |
| 2015/0237389 A1* | 8/2015 | Grouf | H04N 21/4532 725/49 |
| 2015/0286372 A1* | 10/2015 | Swindell | G06F 9/451 715/762 |
| 2015/0370426 A1* | 12/2015 | Carrigan | G11B 27/34 345/173 |
| 2016/0173644 A1* | 6/2016 | Goel | H04L 67/63 709/203 |
| 2016/0239197 A1* | 8/2016 | Strong | G06T 11/001 |
| 2020/0195842 A1 | 6/2020 | Zuo | |

FOREIGN PATENT DOCUMENTS

| | | |
|---|---|---|
| CN | 109358926 A | 2/2019 |
| CN | 109597664 A | 4/2019 |
| CN | 109783182 A | 5/2019 |
| CN | 109857901 A | 6/2019 |
| CN | 110968808 A | 4/2020 |
| CN | 112069341 A | 12/2020 |
| CN | 112667333 A | 4/2021 |
| WO | 2017136996 A1 | 8/2017 |

OTHER PUBLICATIONS

First Office Action issued Dec. 5, 2022 in Chinese Application No. 202110587306.1, with English translation (13 pages).

Second Office Action and Search issued Apr. 7, 2023 in Chinese Application No. 202110587306.1, with English translation (14 pages).

Office Action dated Sep. 8, 2023 in ID Appl. No. P00202108294, English translation (4 pages).

Rejection Decision dated Jul. 29, 2023 in CN Appl. No. 202110587306.1, English translation (9 pages).

International Search Report issued Feb. 14, 2022 in International Application No. PCT/CN2021/106306 (4 pages) with an English translation (2 pages).

* cited by examiner

METHOD AND APPARATUS FOR UPDATING MUSIC PAGE DISPLAY BASED ON COLOR

The present application is a U.S. 371 Application of International Patent Application No. PCT/CN2021/106306, filed on 14 Jul. 2021, which application claims a priority to the Chinese Patent Application No. 202110587306.1, titled "METHOD AND APPARATUS FOR UPDATING PAGE DISPLAY, ELECTRONIC DEVICE, AND STORAGE MEDIUM" filed with the China National Intellectual Property Administration on May 27, 2021, the entire contents of which are hereby incorporated by reference in their entireties.

TECHNICAL FIELD

Embodiments of the present disclosure relate to the field of computer technologies, and more particularly, to a method and apparatus for updating page display, an electronic device, and a storage medium.

BACKGROUND

Generally, in some music, social, reading, or game applications, a rendering effect such as a color of a display interface can be realized by setting a background color, a theme color or other configuration parameters, such that the rendering effect of an interactive interface can be customized. If a user does not actively change color parameters, the color of the interactive interface will not change, and is not related to the user's operations on the interactive interface.

However, for a highly interactive application, the above method for changing the color of the interactive interface cannot reflect or promote interactions between the user and the applications.

SUMMARY

Embodiments of the present disclosure provide a method and apparatus for updating page display, an electronic device, and a storage medium, capable of updating a rendering effect of a display interface of an application based on an interaction between a user and the display interface, and promoting interactions and perception between the user and a product.

In a first aspect, an embodiment of the present disclosure provides a method for updating page display. The method includes: obtaining a cover image of an album to which a currently played song belongs, in response to a page refresh operation of a user; extracting a target dominant color of the cover image; and updating a cover of a predetermined playlist in a song recommendation page based on the target dominant color.

In a second aspect, an embodiment of the present disclosure further provides an apparatus for updating page display. The apparatus includes: an image obtaining module configured to obtain a cover image of an album to which a currently played song belongs, in response to a page refresh operation of a user; a dominant color extraction module configured to extract a target dominant color of the cover image; and a display update module configured to update a cover of a predetermined playlist in a song recommendation page based on the target dominant color.

In a third aspect, an embodiment of the present disclosure further provides an electronic device. The electronic device includes one or more processors, and a storage device configured to store one or more programs. The one or more programs, when executed by the one or more processors, cause the one or more processors to implement the method for updating the page display according to any of the embodiments of the present disclosure.

In a fourth aspect, an embodiment of the present disclosure further provides a storage medium including computer-executable instructions. The computer-executable instructions, when executed by a computer processor, implement the method for updating the page display according to any of the embodiments of the present disclosure.

In a fifth aspect, a computer program product is provided. The computer program product includes computer program instructions. The computer program instructions cause a computer to implement the method for updating the page display according to any of the embodiments of the present disclosure.

In a sixth aspect, a computer program is provided. The computer program, when executed on a computer, causes the computer to implement the method for updating the page display according to any of the embodiments of the present disclosure.

With technical solutions according to the embodiments of the present disclosure, when a user performs a refresh operation on an interface of a music player or an application that can play music, a cover image of an album to which a currently played song belongs is obtained. A target dominant color can be extracted from the cover image. A cover of a predetermined playlist in a song recommendation page can be updated based on the target dominant color. A rendering effect of the refreshed page can thus be changed. The technical solutions according to the embodiments of the present disclosure solve a problem that a setting mode of rendering effects of the page display in the related art is single and has low flexibility, such that a rendering effect of a display interface of an application can be linked with interactions of the user, the rendering effect of the display interface can be updated based on interactions between the user and the display interface, and the user's interactions with and perception of a product can be promoted.

BRIEF DESCRIPTION OF DRAWINGS

The above and other features, advantages, and aspects of embodiments of the present disclosure will become more apparent with reference to the following detailed description in conjunction with the accompanying drawings. Throughout the drawings, same or similar reference numbers represent same or similar elements. It should be understood that the drawings are illustrative, and elements and components are not necessarily drawn to scale.

DESCRIPTION OF EMBODIMENTS

Figure 1:
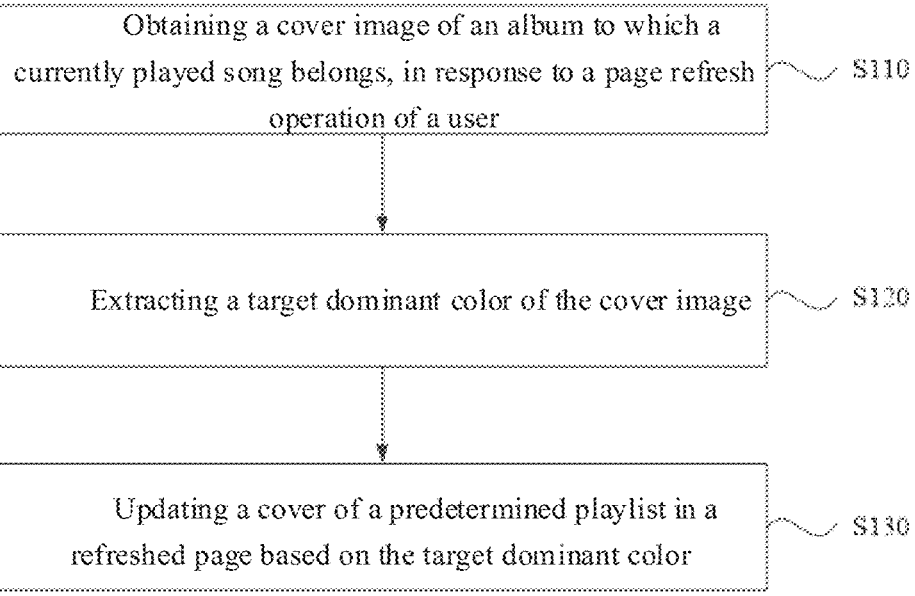
FIG. 1 is a flowchart illustrating a method for updating page display according to Embodiment 1 of the present disclosure.

Embodiments of the present disclosure will be described in more detail below with reference to the accompanying drawings. While some embodiments of the present disclosure are illustrated in the drawings, it should be understood that the present disclosure may be embodied in various forms and should not be construed as being limited to the embodiments set forth herein. Instead, these embodiments are provided for a complete and thorough understanding of the present disclosure. It should be understood that the drawings and the embodiments of the present disclosure are for illustration purposes only and are not intended to limit the scope of the present disclosure.

It should be understood that various steps recited in embodiments of the method of the present disclosure may be performed in a different order, and/or performed in parallel. Moreover, the embodiments of the method may include additional steps and/or omit performing the illustrated steps. The scope of the present disclosure is not limited in this respect.

The term "including" and variations thereof as used herein are open-ended, i.e., "including, but not limited to". The term "based on" means "based at least in part on". The term "one embodiment" means "at least one embodiment", the term "another embodiment" means "at least one additional embodiment"; and the term "some embodiments" means "at least some embodiments". Relevant definitions for other terms will be given in the following description.

It should be noted that terms "first", "second", and the like in the present disclosure are only used for distinguishing different apparatuses, modules, or units, and are not used for limiting an order or interdependence of functions performed by the apparatuses, modules, or units.

It should be noted that terms "a", "an", or "plurality of" in the present disclosure are illustrative rather than limiting, which shall be construed as "one or more" by those skilled in the art, unless clearly indicated otherwise.

Embodiment 1

FIG. 1 is a flowchart illustrating a method for updating page display according to Embodiment 1 of the present disclosure. The embodiments of the present disclosure are applicable to a situation w % here a rendering effect displayed on an interactive interface is updated based on interactions between a user and an application interface, and are especially applicable to a situation where the rendering effect of the interactive interface on a music playing platform is updated in combination with music being played in a music player or other platforms that can play music. The method can be executed by an apparatus for updating page display. The apparatus can be implemented in a form of software and/or hardware, and can be configured in an electronic device, e.g., a mobile terminal or a server device.

As illustrated in FIG. 1, the method for updating the page display according to this embodiment includes the following steps.

In S110, a cover image of an album to which a currently played song belongs is obtained in response to a page refresh operation of a user.

Generally, in the music player or other client that can play music, when the user refreshes the interactive interface, usually only the content displayed on the interactive interface is refreshed, with a rendering effect of the interface remained unchanged. For example, when a client of the music player is opened, a default interface displayed is a song recommendation page, which contains several recommended playlists of songs, such as a daily recommended collection, playlists of recommended collections of different music charts, playlists of artist radio channels classified by artists and singers, recommended playlists classified based on music applicable scenarios, and recommended playlists classified by music types. Each of these playlists uses an image associated with recommended music in the playlist as a cover. The cover of the playlist can be used as an entrance of the playlist. When the user clicks on the cover, a display interface of the client can display a list of recommended songs of a corresponding playlist for the user to browse or play. The cover of the playlist can also only be used as a display picture that displays a style or characteristic of songs in the playlist for the user to watch.

On the song recommendation page, when the user triggers the page refresh operation by pulling down the page or clicking a refresh control, etc., the playlist of recommended songs displayed on the song recommendation page may change, showing recommended playlists that have not been displayed before, or the content of recommended songs in a certain playlist of recommended songs has been updated. Normally, there will be no change in the rendering effect of the song recommendation page.

In this embodiment, if the music player or other client that can play music is playing a song while the user is triggering a refresh operation on a page that the user interacts with by pulling down the page or clicking the refresh control, the cover image of the album that the currently played song belongs to may be automatically obtained to update the rendering effect of the refreshed page based on a color of the cover or the content of the image, such that the rendering effect can display or highlight an atmosphere of a currently played music, thereby making it easier for the user to immerse himself/herself in music, and enhancing interactions between the user and the display interface of the music player.

In S120, a target dominant color of the cover image is extracted.

Specifically, before the rendering effect of the refreshed recommended page is updated, the target dominant color of a picture of the obtained cover image needs to be extracted from the picture as a basis for subsequent updates of the rendering effect.

When the target dominant color of the cover image is calculated, an average color picking method can be used to take an average value of color values of all pixels or color values of pixels in a specified region in the cover image as the target dominant color, or a cluster analysis method can be used to extract the target dominant color. In addition, the target dominant color can also be obtained by inputting the cover image into a color extraction neural network model generated in accordance with certain rules and determining the target dominant color from an output of the model.

In S130, a cover of a recommended entrance of a predetermined song in a refreshed page is updated based on the target dominant color.

A cover of a predetermined playlist usually contains some character images, cartoon patterns or images of other patterns, as well as texts, and has a certain sense of layers as a whole, because the cover is usually synthesized by a plurality of layers. Among the plurality of layers that synthesize the cover, one is a background color layer, which forms a dominant color of the cover. Therefore, the extracted target dominant color can be used as a new color of the background color layer, and the new background color layer can be combined with other layers in a current cover of the predetermined playlist except for the background color layer to synthesize a new cover. In this way, the rendering effect of the refreshed page can be updated.

Further, the predetermined playlist may be a playlist of a daily recommended song collection, a playlist of recommended songs of an artist radio channel, or a playlist of recommended theme songs, etc. Attribute information such as the number of layers, a content layout, and a color scheme of the cover of each playlist can correspond to different configuration strategies. When the color of the background color layer of the cover of each playlist is updated, the rendering effect of the cover will be updated. The background color layer can be a pure color layer or a gradient color layer determined based on the target dominant color.

In technical solutions according to the embodiments of the present disclosure, when the user performs a refresh operation on an interface of a music player or an application that can play music, the cover image of the album to which the currently played song belongs is obtained. Further, the target dominant color can be extracted from the cover image. The cover of the predetermined playlist in the song recommendation page can be updated based on the target dominant color. The rendering effect of the interactive page triggering the refresh operation can thus be changed. The technical solutions according to the embodiments of the present disclosure solve a problem that a setting mode of the rendering effect of the page display in the related art is single and has low flexibility, such that the rendering effect of the display interface of the application can be linked with interactions of the user, the rendering effect of the display interface can be updated based on interactions between the user and the display interface, and the user's interactions with and perception of a product can be promoted.

Further, in an optional implementation, the extracted target dominant color can be used as the new background color to update the background color of the refreshed page while the cover of the predetermined playlist is updated. Expanding a visual display range of the extracted target dominant color can make it easier for the user to feel an overall atmosphere or mood of the currently played song, thereby enhancing a sense of experience of the user. In addition, a color of a function button such as a play button and other function buttons in the refreshed page can be changed based on the target dominant color.

Figure 2:
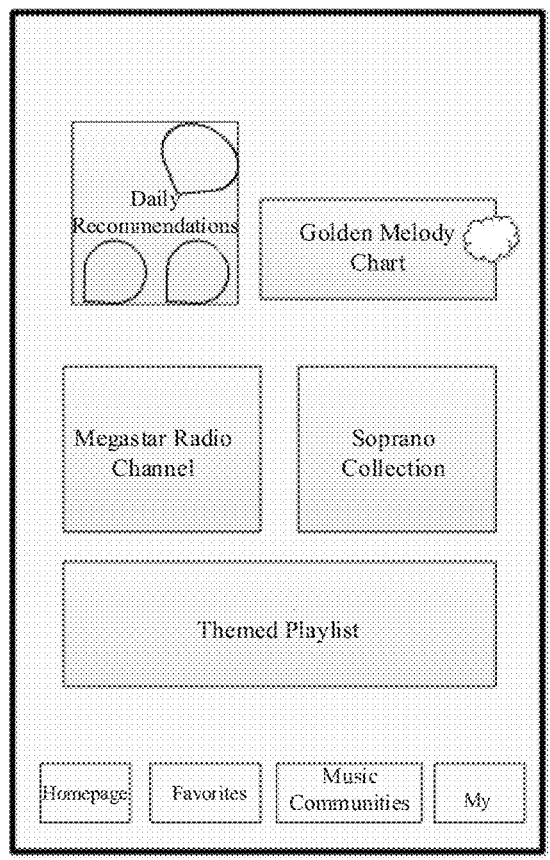
FIG. 2 is a schematic diagram showing a current rendering effect of a song recommendation page according to Embodiment 1 of the present disclosure.
Figure 3:
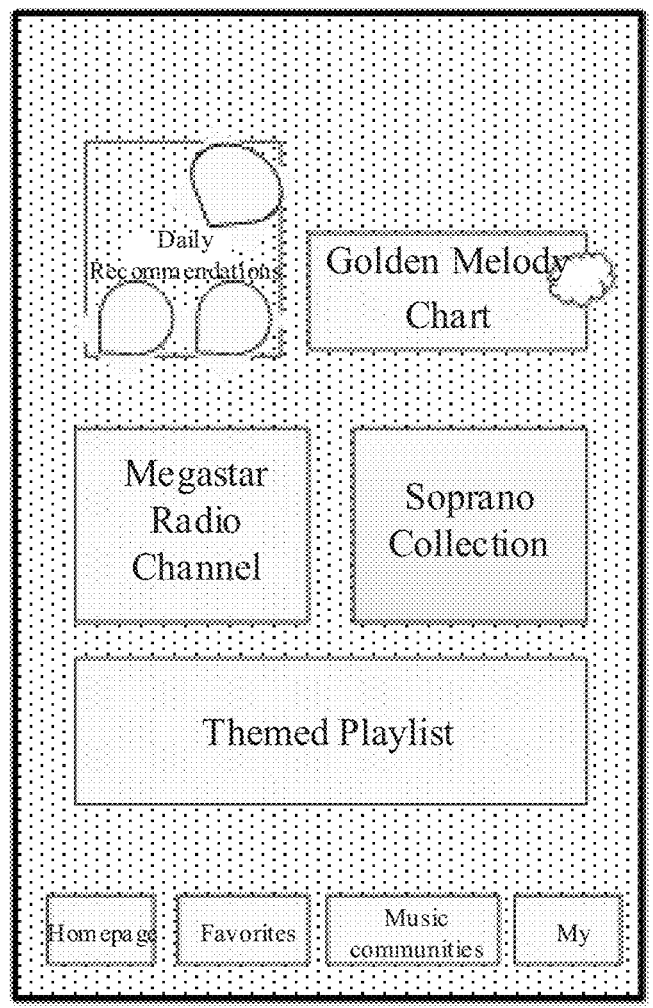
FIG. 3 is a schematic diagram showing an updated rendering effect of a song recommendation page according to Embodiment 1 of the present disclosure.

Specifically, FIG. 2 is an exemplary schematic diagram showing a current rendering effect of a song recommendation page. FIG. 2 illustrates recommended songs and playlist covers, e.g., daily recommendations, a golden melody chart, a megastar radio channel, a soprano collection, and a themed playlist, and switching controls for the homepage, favorite playlists, music communities, and a personalized setting page (My). A fill color of the cover of each playlist indicates a current rendering effect of the page. When the user pulls down the song recommendation page to refresh the page, and the music is being played at the same time, the rendering effect of the page can be updated. For an update result, reference may be made to a schematic diagram showing an updated rendering effect of a song recommendation page illustrated in FIG. 3. In FIG. 3, the daily recommended playlist is a predetermined playlist of recommended songs, and the fill color of the cover of the playlist is dotted filling, which represents the cover of the playlist updated based on the extracted target dominant color. In addition, in FIG. 3, an overall background of the song recommendation page has also been updated. Such an effect can increase a possibility of operation interactions between the user and the interactive interface of the music player, and give the user a new sense of experience. Here, it should be explained that after the page is refreshed, the playlist of recommended songs can display a playlist of recommended songs that has not been displayed, or can still display the playlist of recommended songs in a current song recommendation page.

Embodiment 2

This embodiment of the present disclosure can be combined with various optional schemes in the method for updating the page display according to the above embodiment. The method for updating the page display according to this embodiment provides a preferred method for extracting the target dominant color, which can optimize the rendering effect of the cover of the predetermined playlist.

Figure 4:
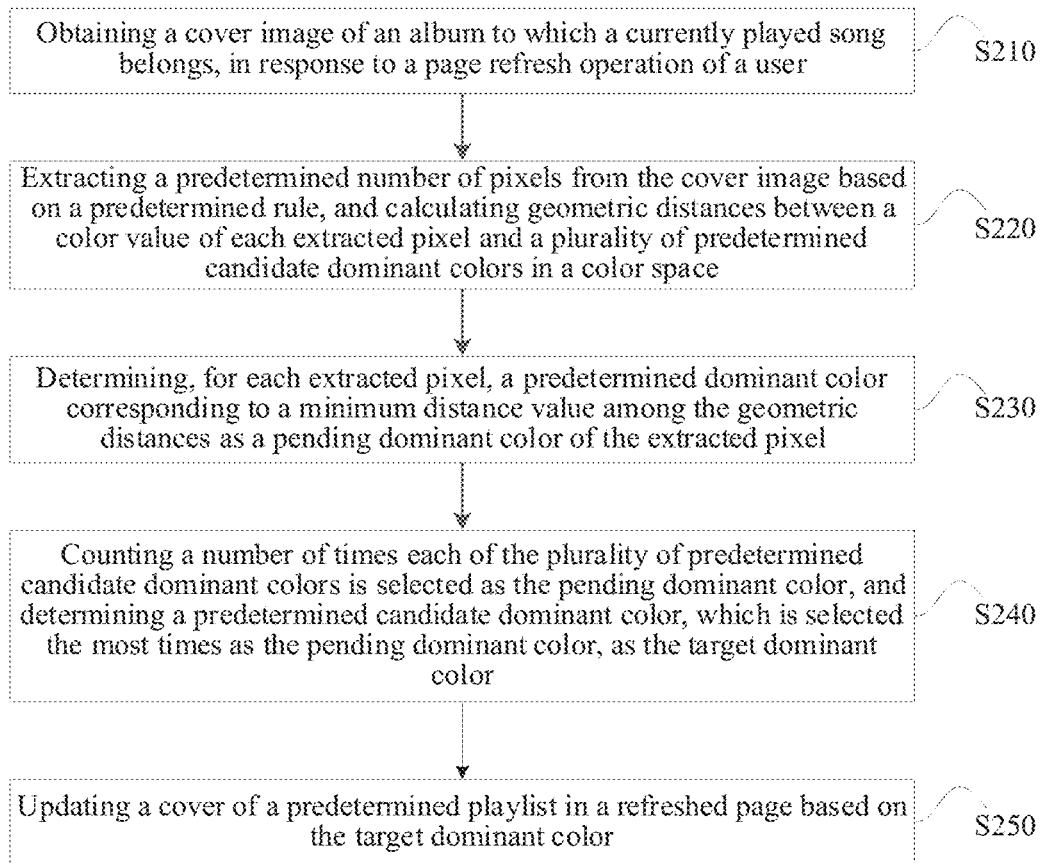
FIG. 4 is a flowchart illustrating a method for updating page display according to Embodiment 2 of the present disclosure.

FIG. 4 is a flowchart illustrating a method for updating page display according to Embodiment 2 of the present disclosure. As illustrated in FIG. 4, the method for updating the page display according to this embodiment includes the following steps.

In S210, a cover image of an album to which a currently played song belongs is obtained in response to a page refresh operation of a user.

In S220, a predetermined number of pixels are extracted from the cover image based on a predetermined rule, and geometric distances between a color value of each extracted pixel and a plurality of predetermined candidate dominant colors in a color space are calculated.

Considering that there is a high probability that an album cover of a song displays a singer's face image, and colors of human faces are mainly yellow, a conventional method of averaging color values of pixels or a conventional cluster color extraction method may lead to that a distribution of the calculated target dominant color is mostly concentrated in yellow. After the page is refreshed, the color distribution of the rendering effect may be uneven, which is inconsistent with a dominant color of visual perception. Therefore, in this embodiment, an algorithm for calculating the target dominant color of an album cover image is further provided.

The geometric distances between the color value of each extracted pixel in the cover image and the plurality of predetermined candidate dominant colors in the color space are calculated. A color value of a pixel can be an RGB value of three primary colors. The plurality of predetermined candidate dominant colors may be candidate dominant colors set in accordance with commonly used colors, or colors similar to an appearance color that the music player can provide may be determined as the predetermined candidate dominant colors, e.g., red, orange, yellow, green, cyan, blue, purple and pink. The color space refers to Hue, Saturation, Value (HSV). An RGB value of a pixel can be converted into an HSV value corresponding to the color space, and then a geometric distance between each pixel and the HSV value of each predetermined candidate dominant color can be calculated.

Preferably, considering calculation efficiency of extracting the target dominant color, the predetermined number of pixels may be selected at a medium distance from the cover image based on a size of the cover image, so as to reduce an amount of calculation. For example, in the cover image, one pixel is selected every three pixels, and a geometric distance between the selected pixel and the predetermined candidate dominant color in the color space is calculated. In a process of selecting pixels, if the number of pixels to be selected has been determined, a pitch at which pixels are to be selected can be determined based on the size of the cover image. If pixels are to be selected at a fixed pitch, the number of pixels can be further determined based on the size of the cover image.

In S230, for each extracted pixel, a predetermined dominant color corresponding to a minimum distance value among the geometric distances is determined as a pending dominant color of the extracted pixel.

After the geometric distances between the color value of each extracted pixel and the plurality of predetermined candidate dominant colors in the color space are calculated, distance values of a number identical to the number of predetermined candidate dominant colors can be obtained. It can be understood that the closer a distance between the color value of a pixel and the candidate dominant color within the color space is, the more similar the colors of the pixel and the candidate dominant color have, and thus a pending dominant color can be determined for each pixel.

In S240, a number of times each of the plurality of predetermined candidate dominant colors is selected as the pending dominant color is counted, and a predetermined candidate dominant color, which is selected the most times as the pending dominant color, is determined as the target dominant color.

In this step, from a comprehensive consideration of pending dominant colors of all pixels, the predetermined candidate dominant color, which is selected the most times as the pending dominant color, can be determined as the target dominant color, such that a visual dominant color can be extracted satisfyingly from the whole.

In a feasible real-time implementation, for each of the plurality of predetermined candidate dominant colors, after the number of times the predetermined candidate dominant color is selected as the pending dominant color is counted, a product of a statistical value of the number of times the predetermined candidate dominant color is selected as the pending dominant color and a predetermined weight value corresponding to the predetermined candidate dominant color is calculated. Values of products corresponding to the plurality of predetermined candidate dominant colors are ranked. A predetermined candidate dominant color corresponding to a maximum value in a result of the ranking is determined as the target dominant color. The predetermined weight value corresponding to the predetermined candidate dominant color may be an empirical value that can make a visual effect better, or a personalized parameter value set based on personal preference for a certain candidate dominant color.

In S250, a cover of a predetermined playlist in a refreshed page is updated based on the target dominant color.

With technical solutions according to the embodiments of the present disclosure, when the user performs a refresh operation on an interface of a music player or an application that can play music, the cover image of the album to which the currently played song belongs is obtained. Further, the target dominant color can be extracted from the cover image. The cover of the predetermined playlist in the song recommendation page can be updated based on the target dominant color. The rendering effect of the refreshed page can thus be changed. This embodiment further provides a method for extracting a target dominant color of a cover image, which determines a target candidate dominant color based on geometric distances between the color value of each extracted pixel and the plurality of candidate dominant colors in the color space. The technical solutions according to the embodiments of the present disclosure solve the problem that a setting mode of the rendering effect of the page display in the related art is single and has low flexibility, such that the rendering effect of the display interface of the application can be linked with interactions of the user, the rendering effect of the display interface can be updated based on interactions between the user and the display interface, and the user's interactions with and perception of a product can be promoted. In addition, a problem that the extracted dominant color is always yellowish is solved, and thus the obtained dominant color is more uniform in distribution and is more in line with the dominant color visually sensed, thereby optimizing the rendering effect of a page after an update.

Embodiment 3

This embodiment of the present disclosure can be combined with various optional schemes in the method for updating the page display according to the above embodiments. The method for updating the page display according to this embodiment further explains a specific process of updating the cover of the predetermined playlist based on the target dominant color.

Figure 5:
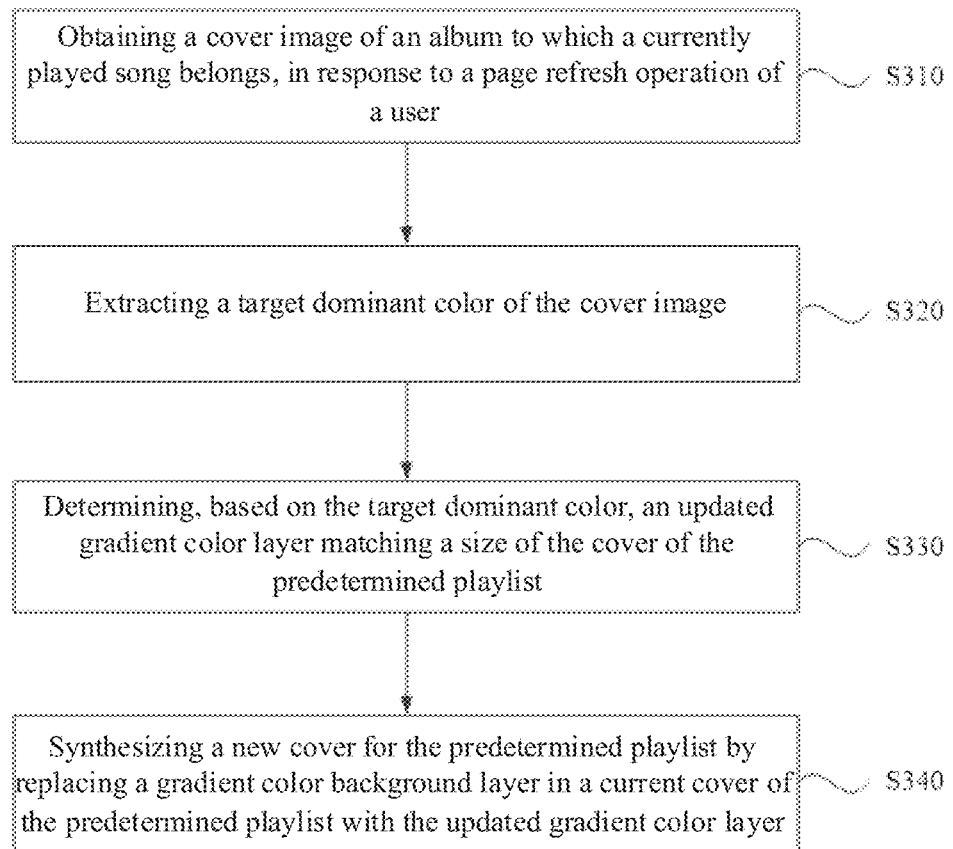
FIG. 5 is a flowchart illustrating a method for updating page display according to Embodiment 3 of the present disclosure.

FIG. 5 is a flowchart illustrating a method for updating page display according to Embodiment 3 of the present disclosure. As illustrated in FIG. 5, the method for updating the page display according to this embodiment includes the following steps.

In S310, a cover image of an album to which a currently played song belongs is obtained in response to a page refresh operation of a user.

In S320, a target dominant color of the cover image is extracted.

In S330, an updated gradient color layer matching a size of the cover of the predetermined playlist is determined based on the target dominant color.

Figure 6:
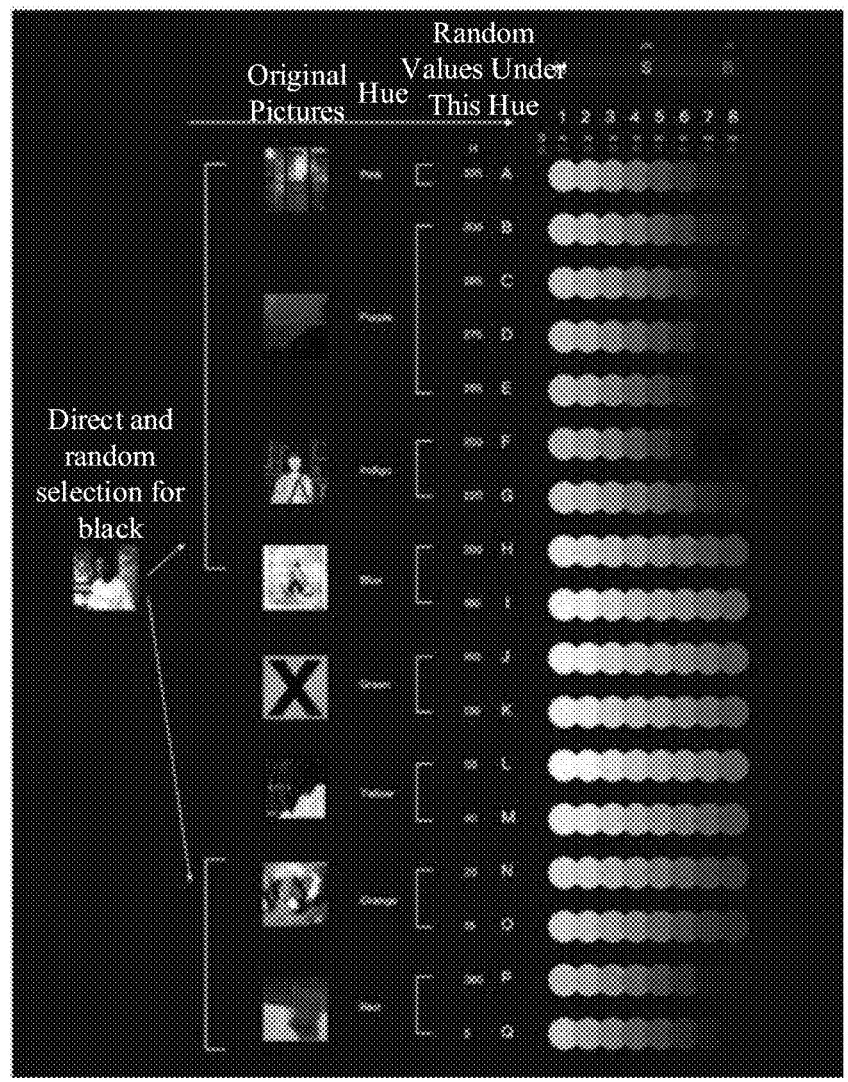
FIG. 6 is a schematic diagram showing determining of a gradation scheme of a target dominant color according to Embodiment 3 of the present disclosure.

Specifically, in this embodiment, the background color layer of the cover of the predetermined playlist is set as a gradient color layer. A process of determining a gradient scheme based on the target dominant color can refer to the schematic diagram illustrated in FIG. 6. An original picture column refers to obtained cover images of albums to which currently played songs belong, and a hue column refers to target dominant colors (including pink, purple, indigo, blue, green, yellow, orange, and red) corresponding to the cover images. A random column under this hue means that in a range of a hue H corresponding to the target dominant color, a value can be randomly selected for H, and then saturation values (S values) and brightness values (B values) of an upper left pixel and a lower right pixel in the updated gradient color layer can be determined based on a predetermined strategy to generate the updated gradient color layer. Alternatively, the updated gradient color layer can be generated based on saturation values (S values) and brightness values (B values) of an upper right pixel and a lower left pixel. In FIG. 6, eight sets of SB value combinations are listed, in which 1 means that the S value is 40 and the B value is 100; 2 means that the S value is 50 and the B value is 100; 3 means that the S value is 60 and the B value is 90; 4 means that the S value is 70 and the B value is 80; 5 means that the S value is 80 and the B value is 70; 6 means that the S value is 90 and the B value is 60; 7 means the S value is 100 and the B value is 50; and 8 means that the S value is 100 and the B value is 40. In addition, if the target dominant color of the cover image determined by calculation is black, one of the predetermined candidate dominant colors is selected randomly as the corresponding target dominant color.

Further, the saturation values (S values) and brightness values (B values) of the upper left pixel and the lower right pixel in the updated gradient color layer can be determined through a random set of combined values, or determined based on a category of the predetermined playlist. For example, for a playlist of recommended songs of a theme radio channel with gradation from an upper left corner to a lower right corner, values of the saturation values (S values) and brightness values (B values) of the upper left pixel and the lower right pixel are taken from the third set of values and the sixth set of values, respectively. For a daily recommended playlist with gradation from a lower left corner to an upper right corner, values of the saturation values (S values) and brightness values (B values) of the lower left pixel and the upper right pixel are taken from the first set of values and the sixth set of values, respectively.

In S340, a new cover for the predetermined playlist is synthesized by replacing a gradient color background layer in a current cover of the predetermined playlist with the updated gradient color layer.

After the color of the gradient color layer is updated, the cover of the predetermined playlist will be updated.

In a specific implementation process, layer replacement is equivalent to recombining the updated gradient color layer with other set layers to generate a new cover. The number of layers of covers of playlists of different categories and content layouts of respective layers are different.

Figure 7:
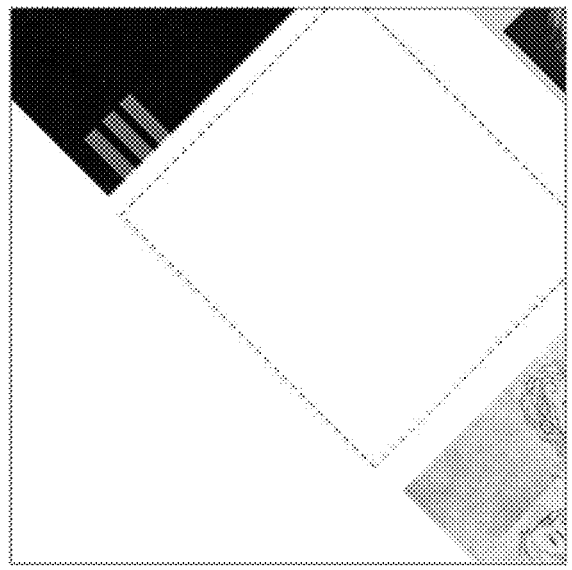
FIG. 7 is a schematic diagram showing a corner picture according to Embodiment 3 of the present disclosure.
Figure 8:
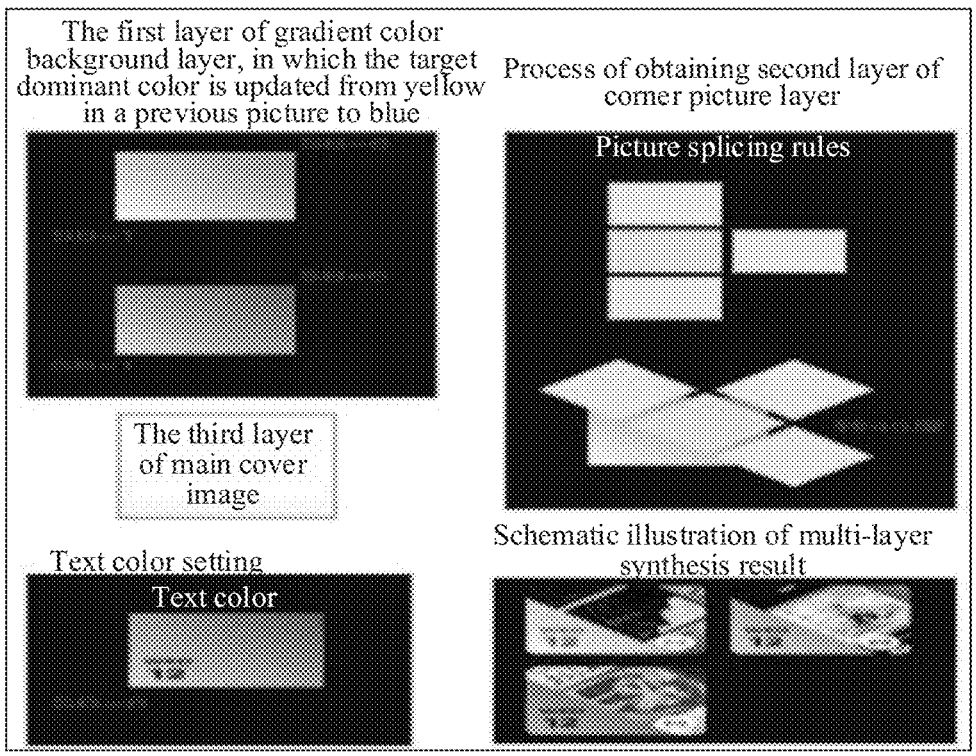
FIG. 8 is a schematic diagram showing a process of forming a cover of a daily recommended playlist according to Embodiment 3 of the present disclosure.

Exemplarily, for the playlist of the daily recommended song collection, its cover can be composed of three layers. The first layer is a gradient background layer. The second layer is a corner picture layer, i.e., three corners of the second layer are provided with three spliced album covers, respectively. The three covers can be selected from album covers that have been played for a certain number of times, e.g., top 10,000 albums played in each country. Three album pictures are rotated and spliced together to obtain a corner picture, and reference may be made to the schematic diagram provided in FIG. 7. A position of a dotted frame in the entire layer is used to splice with the album cover obtained in step S310 to form a new layer of the album cover. The third layer is a main cover image, i.e., a cover image in the middle, which is the cover image of the album to which the currently played song belongs, i.e., the album cover obtained in step S310. Finally, texts may be added. Specifically, for a synthesis process and effect of the cover of the playlist of the daily recommended song collection, reference may be made to the content illustrated in FIG. 8.

Figure 9:
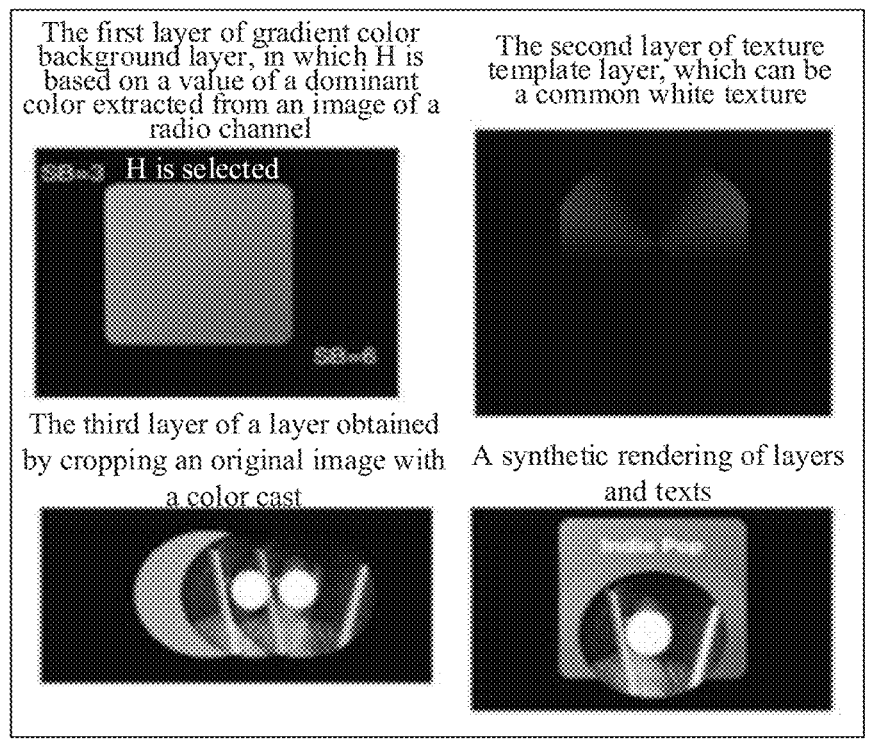
FIG. 9 is a schematic diagram showing a process of forming a cover of a playlist of recommended theme songs according to Embodiment 3 of the present disclosure.

The cover image of a playlist of recommended theme songs of a radio channel can be composed of three layers. The first layer is the gradient background layer. A color of an H value of the gradient color is determined by a dominant color of a radio picture. For the first layer with gradation from the upper left corner to the lower right corner, SB values are taken from the third set of values (SB=3) and the sixth set of values (SB=6). For example, if the calculated dominant color is blue, the H value is randomly selected from 200 to 180. For example, if the selected H value is 200, HSB values in the upper left and lower right corners are (200, 60, 90) and (200, 80, 70), respectively, and then the color of the layer may be changed gradually. The second layer is a texture template layer, a fixed picture set in advance. The third layer is a layer obtained by cropping an original image with a color cast. The original image is a cover image uploaded by an operating user. These three layers are superimposed one by one, and texts are added to obtain a final cover of the playlist of recommended theme songs. For a specific synthesis process and effect, reference may be made to the content illustrated in FIG. 9.

Figure 10:
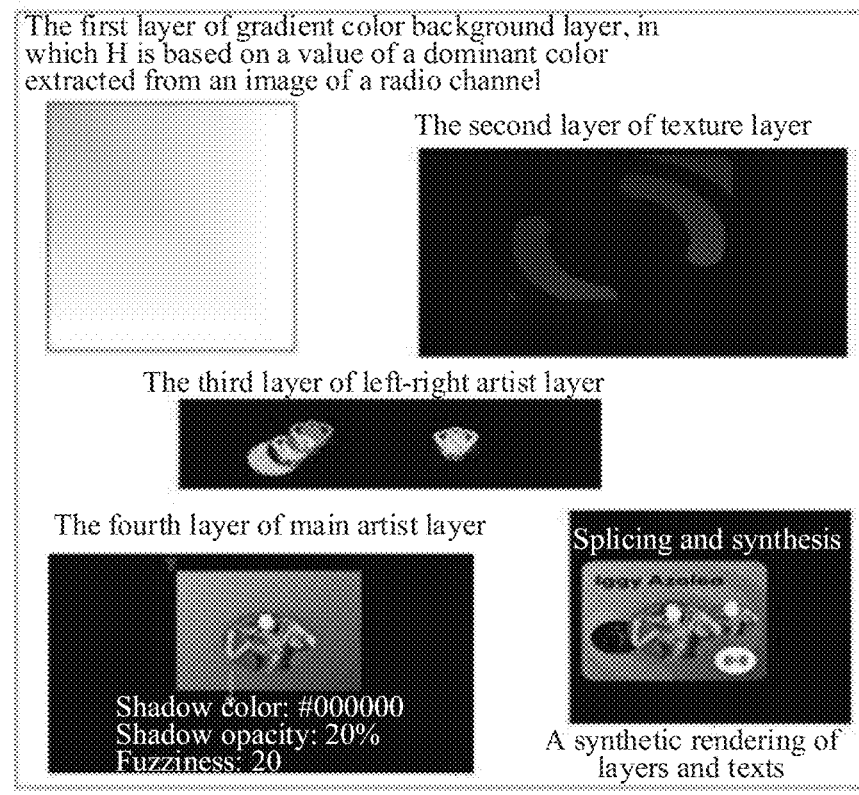
FIG. 10 is a schematic diagram showing a process of forming a cover of a playlist of recommended songs of an artist radio channel according to Embodiment 3 of the present disclosure.

For another example, for the playlist of recommended songs of an artist radio channel, artist radio channels correspond to artists. For different artists, different artist radio channels can be launched, and thus different covers will be displayed. The cover image consists of four layers. The first layer is a gradient background. The H value can be extracted from the target dominant color of a predetermined picture. For example, the HSB values of the lower right pixel are (200, 60, 90), and the HSB values of the upper left pixel are (220, 40, 100). The second layer is a texture layer. A shadow template image can be directly downloaded and used to increase a sense of layers of the image. The third layer is a left-right artist layer, which can be obtained by scaling and cropping an image obtained by combining a predetermined color cast template image with an artist image. The fourth layer is a main artist portrait. The main artist portrait is scaled and cropped into a shape that matches a left-right artist image, and superimposed on the previously generated layers. Finally, texts are added to form the final cover. Here, it should be noted that the main artist is the singer or creator of the song recommended by the artist radio channel. For example, if songs recommended by an artist radio channel are songs of a singer surnamed Wang, the singer surnamed Wang is the main artist. The left-right artist image is an image of a randomly-matched singer whose singing style is similar to that of the main artist. For a specific synthesis process and effect, reference may be made to the content illustrated in FIG. 10.

With technical solutions according to the embodiments of the present disclosure, when the user performs a refresh operation on an interface of a music player or an application that can play music, the cover image of the album to which the currently played song belongs is obtained. Further, the target dominant color can be extracted from the cover image. The cover of the predetermined playlist in the song recommendation page can be updated based on the target dominant color. The rendering effect of the song recommendation page can thus be changed. In addition, the process of updating the cover of the playlist is explained based on different types of playlists. The technical solutions according to the embodiments of the present disclosure solve the problem that a setting mode of the rendering effect of the page display in the related art is single and has low flexibility, such that the rendering effect of the display interface of the application can be linked with interactions of the user, the rendering effect of the display interface can be updated based on interactions between the user and the display interface, and the user's interactions with and perception of a product can be promoted.

The synthesis schemes of the cover images of the predetermined playlists of the above three types are merely illustrative and do not impose any specific limitation.

The method for updating the page display according to this embodiment of the present disclosure and the method for updating the page display according to the above embodiments belong to the same concept of disclosure. For technical details not described in this embodiment in detail, reference may be made to the above embodiments. Same technical features have same beneficial effects in this embodiment and the above embodiments.

Here, it should be explained that an update process of the cover image according to any of the above embodiments can be completed at a server end, and the cover image can be sent to a client to be rendered and displayed directly on the client; or the cover image can be updated and displayed on the client; or the process can be completed by both the server end and the client. A specific execution strategy may be determined based on data processing efficiency during a process of implementing the embodiments.

Embodiment 4

Figure 11:
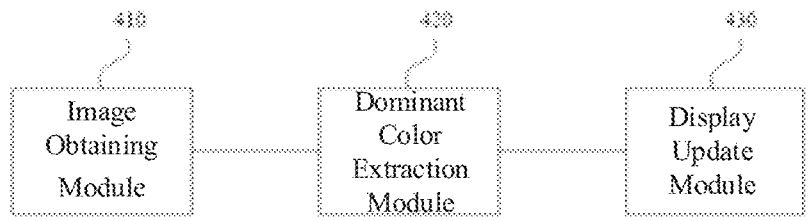
FIG. 11 is a block diagram showing a structure of an apparatus for updating page display according to Embodiment 4 of the present disclosure.

FIG. 11 is a block diagram showing a structure of an apparatus for updating page display according to Embodiment 4 of the present disclosure. The apparatus for updating the page display according to this embodiment is applicable to a situation where a display rendering effect of an interactive interface is updated based on interactions between a user and an application interface.

As illustrated in FIG. 11, the apparatus for updating the page display includes an image obtaining module 410, a dominant color extraction module 420, and a display update module 430.

The image obtaining module 410 is configured to obtain a cover image of an album to which a currently played song belongs, in response to a page refresh operation of a user. The dominant color extraction module 420 is configured to extract a target dominant color of the cover image. The display update module 430 is configured to update a cover of a predetermined playlist in a song recommendation page based on the target dominant color.

In technical solutions according to the embodiments of the present disclosure, when the user performs a refresh operation on an interface of a music player or an application that can play music, the cover image of the album to which the currently played song belongs is obtained. Further, the target dominant color can be extracted from the cover image. The cover of the predetermined playlist in the song recommendation page can be updated based on the target dominant color. The rendering effect of the refreshed page can thus be changed. The technical solutions according to the embodiments of the present disclosure solve the problem that a setting mode of the rendering effect of the page display in the related art is single and has low flexibility, such that the rendering effect of the display interface of the application can be linked with interactions of the user, the rendering effect of the display interface can be updated based on interactions between the user and the display interface, and the user's interactions with and perception of a product can be promoted.

In some optional implementations, the dominant color extraction module 420 specifically includes a pixel extraction sub-module, a pending dominant color extraction sub-module, and a target dominant color determination sub-module.

The pixel extraction sub-module is configured to extract a predetermined number of pixels from the cover image based on a predetermined rule, and calculate geometric distances between a color value of each extracted pixel and a plurality of predetermined candidate dominant colors in a color space.

The pending dominant color extraction sub-module is configured to determine, for each extracted pixel, a predetermined dominant color corresponding to a minimum distance value among the geometric distances as a pending dominant color of the extracted pixel.

The target dominant color determination sub-module is configured to count a number of times each of the plurality of predetermined candidate dominant colors is selected as the pending dominant color, and determine a predetermined candidate dominant color, which is selected the most times as the pending dominant color, as the target dominant color.

In some optional implementations, the pixel extraction sub-module is specifically configured to extract the predetermined number of pixels from the cover image at an equal distance based on a size of the cover image.

In some optional implementations, the target dominant color determination sub-module is specifically configured to: for each of the plurality of predetermined candidate dominant colors, count the number of times the predetermined candidate dominant color is selected as the pending dominant color, and calculate a product of a statistical value of the number of times the predetermined candidate dominant color is selected as the pending dominant color and a predetermined weight value corresponding to the predetermined candidate dominant color, and rank values of products corresponding to the plurality of predetermined candidate dominant colors, and determine a predetermined candidate dominant color corresponding to a maximum value in a result of the ranking as the target dominant color.

In some optional implementations, the apparatus for updating the page display further includes a background color update module. The background color update module is configured to update a background color of the refreshed page by using the target dominant color as a new background color, and/or change a color of a function button in the refreshed page based on the target dominant color.

In some optional implementations, the display update module 430 includes a gradient color layer generation sub-module and a cover update sub-module.

The gradient color layer generation sub-module is configured to determine, based on the target dominant color, an updated gradient color layer matching a size of the cover of the predetermined playlist.

The cover update sub-module is configured to synthesize a new cover for the predetermined playlist by replacing a gradient color background layer in a current cover of the predetermined playlist with the updated gradient color layer.

In some optional implementations, the gradient color layer generation sub-module is specifically configured to: select a hue value within a hue range corresponding to the target dominant color randomly; and determine saturation values and brightness values of an upper left pixel and a lower right pixel in the updated gradient color layer based on a category of the predetermined playlist, in which covers of predetermined playlists of different categories correspond to different color gradient strategies; and generate the updated gradient color layer based on the hue value and the saturation values and the brightness values of the upper left pixel and the lower right pixel in the updated gradient color layer.

In some optional implementations, the cover update sub-module is further configured to replace, when the cover of the predetermined playlist contains an album cover layer, a main cover image in the album cover layer in the current cover with the cover image. The main cover image is a cover image displayed in a center of the album cover layer.

In some optional implementations, the predetermined playlist includes a playlist of a daily recommended song collection, a playlist of recommended songs of an artist radio channel, and a playlist of recommended theme songs.

The apparatus for updating the page display according to this embodiment of the present disclosure can implement the method for updating the page display according to any embodiment of the present disclosure, and has corresponding functional modules and beneficial effects for performing the method.

It is to be noted that units and modules included in the above apparatus are only divided based on functional logics, but are not limited to the above division, as long as corresponding functions can be realized. In addition, specific names of the functional units are simply used to facilitate distinguishing from each other, rather than to limit the protection scope of the embodiments of the present disclosure.

Embodiment 5

Figure 12:
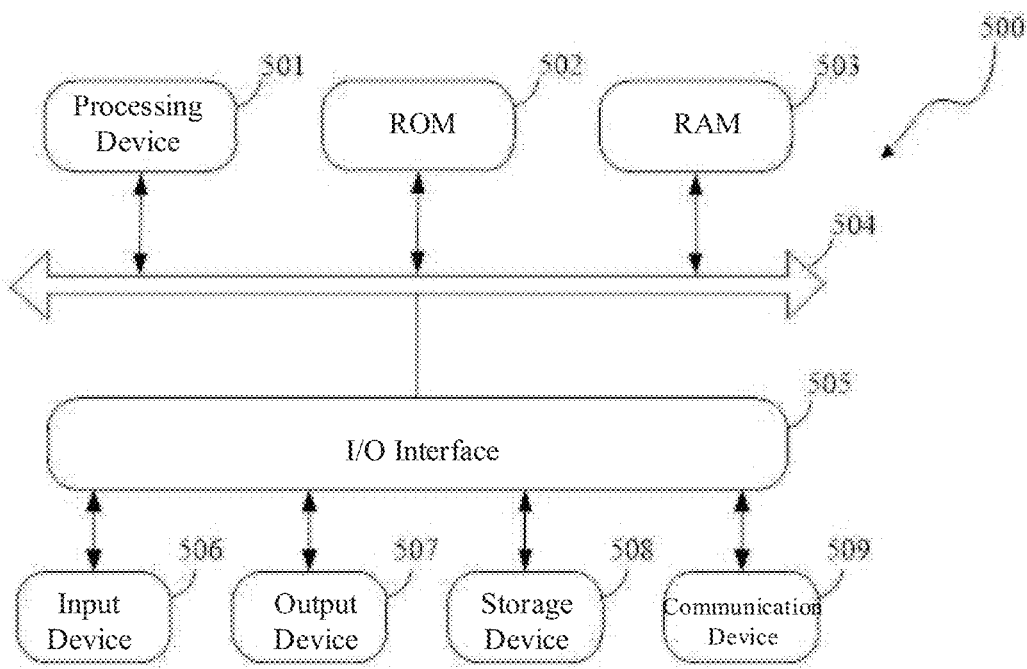
FIG. 12 is a block diagram showing a structure of an electronic device according to Embodiment 5 of the present disclosure.

Reference is now made to FIG. 12, which is a schematic diagram illustrating an electronic device 500 (e.g., a terminal device or a server illustrated in FIG. 12) adapted to implement the embodiments of the present disclosure. The terminal device according to the embodiment of the present disclosure may include, but not limited to, a mobile terminal such as a mobile phone, a laptop computer, a digital broadcast receiver, a Personal Digital Assistant (PDA), a tablet computer or PAD, a Portable Multimedia Player (PMP), or a vehicle-mounted terminal (e.g., a vehicle-mounted navigation terminal), or a fixed terminal such as a digital TV, a desktop computer, etc. The electronic device illustrated in FIG. 12 is exemplary only, and should not be construed as limiting the function and scope of use of the embodiments of the present disclosure.

As illustrated in FIG. 12, the electronic device 500 may include a processing device 501 (e.g., a central processing unit, a graphics processor, etc.), which may perform various appropriate actions and processes in accordance with programs stored in a Read Only Memory (ROM) 502 or loaded from a storage device 506 into a Random Access Memory (RAM) 503. Various programs and data required for operation of the electronic device 500 may also be stored on the RAM 503. The processing device 501, the ROM 502, and the RAM 503 are connected to each other through a bus 504. An input/output (I/O) interface 505 is also connected to bus 504.

Generally, the following devices may be connected to the I/O interface 505: input devices 506 including, for example, a touch screen, a touch pad, a keyboard, a mouse, a camera, a microphone, an accelerometer, a gyroscope, etc.; an output device 507 including, for example, a Liquid Crystal Display (LCD), a speaker, a vibrator, and the like; a storage device 508 including, for example, magnetic tape, hard disk, etc.; and a communication device 509. The communication device 509 may allow the electronic apparatus 500 to perform wireless or wired communication with other devices for data exchange. Although FIG. 12 illustrates the electronic device 500 having various means, it can be appreciated that it is not necessary to implement or provide all the illustrated devices. Alternatively, more or fewer devices may be implemented or provided.

In particular, according to an embodiment of the present disclosure, the processes described above with reference to the flowcharts may be implemented as computer software programs. For example, an embodiment of the present disclosure includes a computer program product, which includes a computer program carried on a computer-readable medium. The computer program includes program codes for implementing the method illustrated in any of the flowcharts. In these embodiments, the computer program may be downloaded and installed from a network through the communication device 509, or installed from the storage device 506, or installed from the ROM 502. When the computer program is executed by the processing device 501, the above-mentioned functions defined in the method for updating the page display according to the embodiments of the present disclosure are performed.

The electronic device according to this embodiment of the present disclosure and the method for updating the page display according to the above embodiments belong to the same concept of disclosure. For technical details not described in this embodiment in detail, reference may be made to the above embodiments. This embodiment has the same beneficial effects as the above embodiments.

Embodiment 6

An embodiment of the present disclosure provides a computer storage medium. The computer storage medium stores a computer program. The computer program, when executed by a processor, implements the method for updating the page display according to the above embodiments.

It is to be noted that the above computer-readable medium in the present disclosure may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but not limited to: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, which may transmit, propagate, or transfer programs used by or used with an instruction execution system, apparatus or device. The program codes contained on the computer-readable medium may be transferred via any appropriate medium, including but not limited to electric cable, optical cable, Radio Frequency (RF), or any suitable combination thereof.

In some embodiments, the client and the server may communicate using any currently known or future-developed network protocol, such as HTTP (HyperText Transfer Protocol), and may be in communication interconnection with digital data in any form or medium (e.g., a communication network). Examples of communication networks include a Local Area Network ("LAN"), a Wide Area Network ("WAN"), the Internet work (e.g., the Internet), and an end-to-end network (e.g., ad hoc end-to-end network), as well as any currently known or future-developed network.

The above-mentioned computer readable medium may be contained in the above-mentioned electronic device, or it may be separated and not assembled into the electronic device.

The above-mentioned computer readable medium carries one or more programs which, when executed by the electronic device, cause the electronic device to: obtain a cover image of an album to which a currently played song belongs, in response to a page refresh operation of a user; extract a target dominant color of the cover image; and update a cover of a predetermined playlist in a song recommendation page based on the target dominant color.

The computer program codes for implementing the operations according to the embodiments of the present disclosure may be written in one or more programming languages or any combination thereof. The programming languages may include object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of network, including a Local Area Network (LAN) or a Wide Area Network (WAN), or to an external computer (e.g., over the Internet by using an Internet service provider).

The flowcharts and block diagrams in the accompanying drawings illustrate architectures, functions, and operations of possible implementations of systems, methods, and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It should also be noted that, in some alternative implementations, the functions showed in blocks may occur in an order other than the order illustrated in the drawings. For example, two blocks illustrated in succession may actually be executed substantially in parallel with each other, or sometimes even in a reverse order, depending on functions involved. It should also be noted that each block in the block diagrams and/or flowcharts, or any combination of the blocks in the block diagrams and/or flowcharts, may be implemented using a dedicated hardware-based system configured to perform specified functions or operations or may be implemented using a combination of dedicated hardware and computer instructions.

The units described in the embodiments of the present disclosure may be embodied as software or hardware. Here, names of the units and modules do not constitute a limitation on the units or the modules under certain circumstances. For example, a data generation module can also be described as a "video data generation module".

The functions described herein above may be performed, at least in part, by one or more hardware logic components. For example, without limitation, exemplary types of suitable hardware logic components include a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

In the context of this disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of a machine-readable storage medium would include an electrical connection having one or more wires, a portable computer disk, a hard disk, a Random Access Memory (RAM), a Read Only Memory (ROM), an Erasable Programmable Read Only Memory (EPROM) or flash memory, an optical fiber, a Compact Disc Read Only Memory (CD-ROM), an optical memory device, a magnetic memory device, or any suitable combination thereof.

According to one or more embodiments of the present disclosure, [Example 1] provides a method for updating page display. The method includes: obtaining a cover image of an album to which a currently played song belongs, in response to a page refresh operation of a user; extracting a target dominant color of the cover image; and updating a cover of a predetermined playlist in a refreshed page based on the target dominant color.

According to one or more embodiments of the present disclosure, [Example 2] provides a method for updating page display. The method further includes that said extracting the target dominant color of the cover image includes: extracting a predetermined number of pixels from the cover image based on a predetermined rule, and calculating geometric distances between a color value of each extracted pixel and a plurality of predetermined candidate dominant colors in a color space; determining, for each extracted pixel, a predetermined dominant color corresponding to a minimum distance value among the geometric distances as a pending dominant color of the extracted pixel; and counting a number of times each of the plurality of predetermined candidate dominant colors is selected as the pending dominant color, and determining a predetermined candidate dominant color, which is selected the most times as the pending dominant color, as the target dominant color.

According to one or more embodiments of the present disclosure, [Example 3] provides a method for updating page display. The method further includes that said extracting the predetermined number of pixels from the cover image based on the predetermined rule includes extracting the predetermined number of pixels from the cover image at an equal distance based on a size of the cover image.

According to one or more embodiments of the present disclosure, [Example 4] provides a method for updating page display. The method further includes that said counting the number of times each of the plurality of predetermined candidate dominant colors is selected as the pending dominant color, and said determining the predetermined candidate dominant color, which is selected the most times as the pending dominant color, as the target dominant color include: for each of the plurality of predetermined candidate dominant colors, counting the number of times the predetermined candidate dominant color is selected as the pending dominant color, and calculating a product of a statistical value of the number of times the predetermined candidate dominant color is selected as the pending dominant color and a predetermined weight value corresponding to the predetermined candidate dominant color; and ranking values of products corresponding to the plurality of predetermined candidate dominant colors, and determining a predetermined candidate dominant color corresponding to a maximum value in a result of the ranking as the target dominant color.

According to one or more embodiments of the present disclosure, [Example 5] provides a method for updating page display. The method further includes updating a background color of the refreshed page by using the target dominant color as a new background color, and/or changing a color of a function button in the refreshed page based on the target dominant color.

According to one or more embodiments of the present disclosure, [Example 6] provides a method for updating page display. The method further includes that said updating the cover of the predetermined playlist in the refreshed page based on the target dominant color includes: determining, based on the target dominant color, an updated gradient color layer matching a size of the cover of the predetermined playlist; and synthesizing a new cover for the predetermined playlist by replacing a gradient color background layer in a current cover of the predetermined playlist with the updated gradient color layer.

According to one or more embodiments of the present disclosure, [Example 7] provides a method for updating page display. The method further includes that said determining, based on the target dominant color, the updated gradient color layer matching the size of the cover of the predetermined playlist includes: selecting a hue value within a hue range corresponding to the target dominant color randomly; and determining saturation values and brightness values of an upper left pixel and a lower right pixel in the updated gradient color layer based on a category of the predetermined playlist, wherein covers of predetermined playlists of different categories correspond to different color gradient strategies; and generating the updated gradient color layer based on the hue value and the saturation values and the brightness values of the upper left pixel and the lower right pixel in the updated gradient color layer.

According to one or more embodiments of the present disclosure, [Example 8] provides a method for updating page display. The method further includes, subsequent to said replacing the gradient color background layer in the current cover of the predetermined playlist with the updated gradient color layer, replacing, when the cover of the predetermined playlist contains an album cover layer, a main cover image in the album cover layer in the current cover with the cover image. The main cover image is a cover image displayed in a center of the album cover layer.

According to one or more embodiments of the present disclosure, [Example 9] provides a method for updating page display. The method further includes that the predetermined playlist includes a playlist of a daily recommended song collection, a playlist of recommended songs of an artist radio channel, and a playlist of recommended theme songs.

According to one or more embodiments of the present disclosure, [Example 10] provides an apparatus for updating page display. The apparatus includes: an image obtaining module configured to obtain a cover image of an album to which a currently played song belongs, in response to a page refresh operation of a user; a dominant color extraction module configured to extract a target dominant color of the cover image; and a display update module configured to update a cover of a predetermined playlist in a refreshed page based on the target dominant color.

According to one or more embodiments of the present disclosure, [Example 11] provides an apparatus for updating page display. The apparatus further includes that the dominant color extraction module specifically includes a pixel extraction sub-module, a pending dominant color extraction sub-module, and a target dominant color determination sub-module. The pixel extraction sub-module is configured to extract a predetermined number of pixels from the cover image based on a predetermined rule, and calculate geometric distances between a color value of each extracted pixel and a plurality of predetermined candidate dominant colors in a color space. The pending dominant color extraction sub-module is configured to determine, for each extracted pixel, a predetermined dominant color corresponding to a minimum distance value among the geometric distances as a pending dominant color of the extracted pixel. The target dominant color determination sub-module is configured to count a number of times each of the plurality of predetermined candidate dominant colors is selected as the pending dominant color, and determine a predetermined candidate dominant color, which is selected the most times as the pending dominant color, as the target dominant color.

According to one or more embodiments of the present disclosure, [Example 12] provides an apparatus for updating page display. The apparatus further includes that, in some optional implementations, the pixel extraction sub-module is specifically configured to extract the predetermined number of pixels from the cover image at an equal distance based on a size of the cover image.

According to one or more embodiments of the present disclosure, [Example 13] provides an apparatus for updating page display. The apparatus further includes that, in some optional implementations, the target dominant color determination sub-module is specifically configured to: for each of the plurality of predetermined candidate dominant colors, count the number of times the predetermined candidate dominant color is selected as the pending dominant color, and calculate a product of a statistical value of the number of times the predetermined candidate dominant color is selected as the pending dominant color and a predetermined weight value corresponding to the predetermined candidate dominant color; and rank values of products corresponding to the plurality of predetermined candidate dominant colors, and determine a predetermined candidate dominant color corresponding to a maximum value in a result of the ranking as the target dominant color.

According to one or more embodiments of the present disclosure, [Example 14] provides an apparatus for updating page display. In some optional implementations, the apparatus for updating the page display further includes a background color update module. The background color update module is configured to update a background color of the refreshed page by using the target dominant color as a new background color, and/or change a color of a function button in the refreshed page based on the target dominant color.

According to one or more embodiments of the present disclosure, [Example 15] provides an apparatus for updating page display. The apparatus further includes that, in some optional implementations, the display update module 430 includes a gradient color layer generation sub-module and a cover update sub-module. The gradient color layer generation sub-module is configured to determine, based on the target dominant color, an updated gradient color layer matching a size of the cover of the predetermined playlist. The cover update sub-module is configured to synthesize a new cover for the predetermined playlist by replacing a gradient color background layer in a current cover of the predetermined playlist with the updated gradient color layer.

According to one or more embodiments of the present disclosure, [Example 16] provides an apparatus for updating page display. The apparatus further includes that, in some optional implementations, the gradient color layer generation sub-module is specifically configured to: select a hue value within a hue range corresponding to the target dominant color randomly; and determine saturation values and brightness values of an upper left pixel and a lower right pixel in the updated gradient color layer based on a category of the predetermined playlist, in which covers of predetermined playlists of different categories correspond to different color gradient strategies; and generate the updated gradient color layer based on the hue value and the saturation values and the brightness values of the upper left pixel and the lower right pixel in the updated gradient color layer.

According to one or more embodiments of the present disclosure, [Example 17] provides an apparatus for updating page display. The apparatus further includes that, in some optional implementations, the cover update sub-module is further configured to replace, when the cover of the predetermined playlist contains an album cover layer, a main cover image in the album cover layer in the current cover with the cover image. The main cover image is a cover image displayed in a center of the album cover layer.

According to one or more embodiments of the present disclosure, [Example 18] provides an apparatus for updating page display. The apparatus further includes that the predetermined playlist includes a playlist of a daily recommended song collection, a playlist of recommended songs of an artist radio channel, and a playlist of recommended theme songs.

The above description is only intended to explain the preferred embodiments of the present disclosure and the employed principles of the technology. It will be appreciated by those skilled in the art that the scope of the present disclosure herein is not limited to the technical solutions formed by the specific combination of the above technical features, but should also encompass any other combinations of features described above or equivalents thereof without departing from the above concept of the present disclosure. For example, the above features and the technical features disclosed in the present disclosure having similar functions (but not limited to them) are replaced with each other to form the technical solution.

Further, although the operations are depicted in a specific order, this should not be understood as requiring these operations to be performed in the specific order illustrated or in a sequential order. Under certain circumstances, multi-tasking and parallel processing may be advantageous. Likewise, although several specific implementation details are included in the above discussion, these should not be construed as limitations on the scope of the present disclosure. Certain features that are described in the context of separate embodiments can also be implemented in combination in a single embodiment. Conversely, various features described in the context of a single embodiment can also be implemented in multiple embodiments separately or in any suitable combination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A method for updating page display, applied to an electronic device, the method comprising:
   obtaining, by the electronic device, a cover image of an album to which a currently played song belongs, in response to a page refresh operation of a user;
   determining, by the electronic device for each of a predetermined number of pixels from the cover image, a pending dominant color based on geometric distances between a color value of the pixel and a plurality of candidate dominant colors in a color space, and extracting a target dominant color of the cover image based on the pending dominant color; and
   updating, by the electronic device, a cover of a predetermined playlist in a refreshed page based on the target dominant color to change a rendering effect of a refreshed page of a music player or an application for playing music.

2. The method according to claim 1, wherein said determining, for each the pixel, the pending dominant color based on geometric distances between the color value of the pixel and the plurality of candidate dominant colors in the color space, and said extracting the target dominant color of the cover image based on the pending dominant color comprise:
   extracting the predetermined number of pixels from the cover image based on a predetermined rule, and calculating geometric distances between the color value of each extracted pixel and the plurality of predetermined candidate dominant colors in the color space;
   determining, for each extracted pixel, the predetermined dominant color corresponding to a minimum distance value among the geometric distances as the pending dominant color of the extracted pixel; and
   counting a number of times each of the plurality of predetermined candidate dominant colors is selected as the pending dominant color, and determining a predetermined candidate dominant color, which is selected the most times as the pending dominant color, as the target dominant color.

3. The method according to claim 2, wherein said extracting the predetermined number of pixels from the cover image based on the predetermined rule comprises:
   extracting the predetermined number of pixels from the cover image at an equal distance based on a size of the cover image.

4. The method according to claim 2, wherein said counting the number of times each of the plurality of predetermined candidate dominant colors is selected as the pending dominant color, and said determining the predetermined candidate dominant color, which is selected the most times as the pending dominant color, as the target dominant color comprise:
   for each of the plurality of predetermined candidate dominant colors, counting the number of times the predetermined candidate dominant color is selected as the pending dominant color, and calculating a product of a statistical value of the number of times the predetermined candidate dominant color is selected as the pending dominant color and a predetermined weight value corresponding to the predetermined candidate dominant color; and ranking values of products corresponding to the plurality of predetermined candidate dominant colors, and determining a predetermined candidate dominant color corresponding to a maximum value in a result of the ranking as the target dominant color.

5. The method according to claim 1, further comprising:
updating a background color of the refreshed page by using the target dominant color as a new background color, and/or changing a color of a function button in the refreshed page based on the target dominant color.

6. The method according to claim 1, wherein said updating the cover of the predetermined playlist in the refreshed page based on the target dominant color comprises:
determining, based on the target dominant color, an updated gradient color layer matching a size of the cover of the predetermined playlist; and
synthesizing a new cover for the predetermined playlist by replacing a gradient color background layer in a current cover of the predetermined playlist with the updated gradient color layer.

7. The method according to claim 6, wherein said determining, based on the target dominant color, the updated gradient color layer matching the size of the cover of the predetermined playlist comprises:
selecting a hue value within a hue range corresponding to the target dominant color randomly;
determining saturation values and brightness values of an upper left pixel and a lower right pixel in the updated gradient color layer based on a category of the predetermined playlist, wherein covers of predetermined playlists of different categories correspond to different color gradient strategies; and
generating the updated gradient color layer based on the hue value and the saturation values and the brightness values of the upper left pixel and the lower right pixel in the updated gradient color layer.

8. The method according to claim 6, further comprising, subsequent to said replacing the gradient color background layer in the current cover of the predetermined playlist with the updated gradient color layer:
replacing, when the cover of the predetermined playlist contains an album cover layer, a main cover image in the album cover layer in the current cover with the cover image, wherein the main cover image is a cover image displayed in a center of the album cover layer.

9. The method according to claim 1, wherein the predetermined playlist comprises a playlist of a daily recommended song collection, a playlist of recommended songs of an artist radio channel, and a playlist of recommended theme songs.

10. A non-transitory storage medium comprising computer-executable instructions, wherein the computer-executable instructions, when executed by a computer processor, implement the method for updating the page display according to claim 1.

11. An electronic device, comprising:
one or more processors; and
a storage device configured to store one or more programs, wherein the one or more programs, when executed by the one or more processors, cause the one or more processors to perform the following:
obtaining a cover image of an album to which a currently played song belongs, in response to a page refresh operation of a user;
determining, for each of a predetermined number of pixels form the cover image, a pending dominant color based on geometric distances between a color value of the pixel and a plurality of candidate dominant colors in a color space, and extracting a target dominant color of the cover image based on the pending dominant color; and
updating a cover of a predetermined playlist in a refreshed page based on the target dominant color to change a rendering effect of a refreshed page of a music player or an application for playing music.

12. The electronic device according to claim 11, wherein said determining, for each of a predetermined number of pixels form the cover image, a pending dominant color based on geometric distances between a color value of the pixel and a plurality of candidate dominant colors in a color space, and said extracting a target dominant color of the cover image based on the pending dominant color comprises:
extracting the predetermined number of pixels from the cover image based on a predetermined rule, and calculating geometric distances between the color value of each extracted pixel and the plurality of predetermined candidate dominant colors in the color space;
determining, for each extracted pixel, the predetermined dominant color corresponding to a minimum distance value among the geometric distances as the pending dominant color of the extracted pixel; and
counting a number of times each of the plurality of predetermined candidate dominant colors is selected as the pending dominant color, and determining a predetermined candidate dominant color, which is selected the most times as the pending dominant color, as the target dominant color.

13. The electronic device according to claim 12, wherein said extracting the predetermined number of pixels from the cover image based on the predetermined rule comprises:
extracting the predetermined number of pixels from the cover image at an equal distance based on a size of the cover image.

14. The electronic device according to claim 12, wherein said counting the number of times each of the plurality of predetermined candidate dominant colors is selected as the pending dominant color, and said determining the predetermined candidate dominant color, which is selected the most times as the pending dominant color, as the target dominant color comprise:
for each of the plurality of predetermined candidate dominant colors, counting the number of times the predetermined candidate dominant color is selected as the pending dominant color, and calculating a product of a statistical value of the number of times the predetermined candidate dominant color is selected as the pending dominant color and a predetermined weight value corresponding to the predetermined candidate dominant color; and
ranking values of products corresponding to the plurality of predetermined candidate dominant colors, and determining a predetermined candidate dominant color corresponding to a maximum value in a result of the ranking as the target dominant color.

15. The electronic device according to claim 11, wherein the one or more programs, when executed by the one or more processors, further cause the one or more processors to:
update a background color of the refreshed page by using the target dominant color as a new background color, and/or change a color of a function button in the refreshed page based on the target dominant color.

16. The electronic device according to claim 11, wherein said updating the cover of the predetermined playlist in the refreshed page based on the target dominant color comprises:
- determining, based on the target dominant color, an updated gradient color layer matching a size of the cover of the predetermined playlist; and
- synthesizing a new cover for the predetermined playlist by replacing a gradient color background layer in a current cover of the predetermined playlist with the updated gradient color layer.

17. The electronic device according to claim 16, wherein said determining, based on the target dominant color, the updated gradient color layer matching the size of the cover of the predetermined playlist comprises:
- selecting a hue value within a hue range corresponding to the target dominant color randomly; and
- determining saturation values and brightness values of an upper left pixel and a lower right pixel in the updated gradient color layer based on a category of the predetermined playlist, wherein covers of predetermined playlists of different categories correspond to different color gradient strategies; and
- generating the updated gradient color layer based on the hue value and the saturation values and the brightness values of the upper left pixel and the lower right pixel in the updated gradient color layer.

18. The electronic device according to claim 16, the one or more programs, when executed by the one or more processors, further cause the one or more processors to, subsequent to said replacing the gradient color background layer in the current cover of the predetermined playlist with the updated gradient color layer:
- replace, when the cover of the predetermined playlist contains an album cover layer, a main cover image in the album cover layer in the current cover with the cover image, wherein the main cover image is a cover image displayed in a center of the album cover layer.

19. The electronic device according to claim 11, wherein the predetermined playlist comprises a playlist of a daily recommended song collection, a playlist of recommended songs of an artist radio channel, and a playlist of recommended theme songs.

* * * * *